United States Patent [19]

Tsuda

[11] Patent Number: 4,818,797

[45] Date of Patent: Apr. 4, 1989

[54] POLYACRYLATE DERIVATIVE

[75] Inventor: Kenzi Tsuda, Himeji, Japan

[73] Assignee: Daicel Chemical Industries, Ltd., Osaka, Japan

[21] Appl. No.: 139,474

[22] Filed: Dec. 30, 1987

[30] Foreign Application Priority Data

Jan. 10, 1987 [JP] Japan .................................. 62-3725

[51] Int. Cl.$^4$ .............................................. C08F 8/32
[52] U.S. Cl. ................................. 525/329.9; 525/379; 526/310
[58] Field of Search ...................... 325/329.9; 526/310

[56] References Cited

U.S. PATENT DOCUMENTS

| | | | |
|---|---|---|---|
| 4,025,703 | 5/1977 | Pornin et al. ..................... | 525/329.9 |
| 4,042,679 | 8/1977 | Gaffar ................................ | 424/54 |
| 4,097,420 | 6/1978 | Mikes et al. ...................... | 525/329.9 |
| 4,098,880 | 7/1978 | Gaffar ................................ | 424/54 |
| 4,425,346 | 1/1984 | Horlington ......................... | 514/258 |
| 4,659,696 | 4/1987 | Hirai et al. ......................... | 514/18 |

*Primary Examiner*—Joseph L. Schofer
*Assistant Examiner*—Bernard Lipman
*Attorney, Agent, or Firm*—Bryan, Cave, McPheeters & McRoberts

[57] ABSTRACT

Disclosed herein are polyacrylate derivatives such as tetradecyldimethylbenzylammonium salt of polyacrylic acid and benzethonium salt of polyacrylic acid, which are effective as a paint ingredient to prevent the accumulation or attachment of marine organisms such as periphytons to ship's bottom. The polyacrylate derivatives have a very low degree of toxicity.

1 Claim, 4 Drawing Sheets

POLYACRYLATE DERIVATIVE

BACKGROUND OF THE INVENTION

1. Field of the Invention

The present invention relates to a new polyacrylate derivative, and more particularly it relates to a quaternary ammonium salt of polyacrylic acid or polymethacrylic acid.

2. Description of the Prior Art

Among the known quaternary ammonium salt of high molecular weight compounds are quaternary ammonium salts of carboxymethylcellulose such as the dimethyllaurylcetylammonium salt (West German Pat. No. 1,103,336), trimethyloctadecylammonium salt (U.S. Pat. No. 2,881,074), dodecyldimethyl (3,4-dichlorobenzyl-)ammonium salt [Deut. Apotheker-Ztg., 106,(35), 1206-8, (1966)], tetradecylpyridinium salt and cetyltrimethylammonium salt [Pham. Ind., 37,(2), 100, (1976)]. Nevertheless, nothing has heretofore been known about a quaternary ammonium salt of a polymer, such as a polyacrylate derivative as is described in to the present invention.

SUMMARY OF THE INVENTION

The present invention provides a polyacrylate derivative represented by the formula:

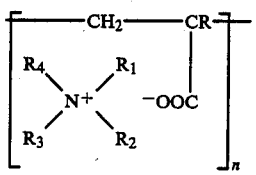

(where R is a hydrogen atom or methyl group; $R_1$ to $R_4$ are groups of which two are methyl groups, one is a benzyl group, and the remaining one is a tetradecyl group or p-1,1,3,3-tetramethylbutylphenoxyethoxyethyl group; and n is a numeral from 50 to 20,000.)

The compounds of the present invention are effective for preventing the accumulation or attachment of marine organisms (e.g., periphytons such as seaweeds or shellfishes) on ship's bottom, fishing nets or various marine structures. In addition, they show a very low degree of toxicity.

DETAILED DESCRIPTION OF THE PREFERRED EMBODIMENTS

Figure 1:
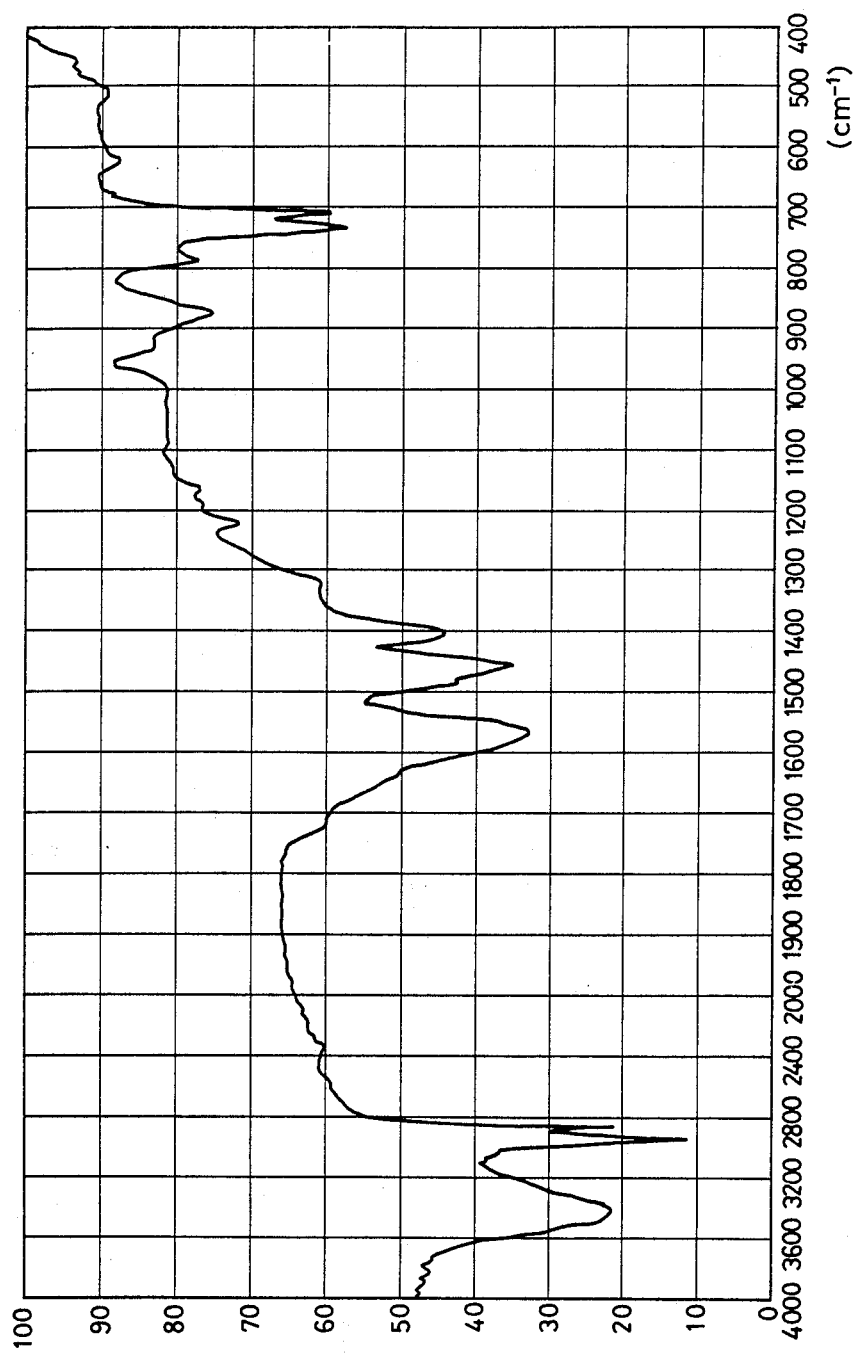
FIG. 1 and FIG. 2 are infrared absorption spectra of tetradecyldimethylbenzylammonium salt of polyacrylic acid and benzethonium salt of polyacrylic acid, respectively, which are the compounds of the invention.

The polyacrylate derivative of the present invention can be obtained by reacting an alkali metal salt (e.g., sodium salt) of polyacrylic acid (or polymethacrylic acid) and a corresponding quaternary ammonium halide in approximately equimolar amount in an aqueous solution. The preferred polyacrylic acid or polymethacrylic acid is one which has a degree of polymerization in the range of about 50 to 20,000 (measured by osmometry). In a case where the polyacrylate derivative is intended for use as an agent for preventing the accumulation or attachment of marine organisms such as periphyton, it is preferred to employ a polyacrylic acid or polymethacrylic acid raw material having a degree of polymerization in the range of about 100 to 1000, because one having an excessively high degree of polymerization shows an undesirably high viscosity.

The reaction gives a product sparingly soluble in water, which precipitates. The precipitate can be collected by filtration and if necessary is purified. The purification can be easily conducted by washing with water; or by dissolving in an organic solvent (e.g., a lower alkanol such as ethanol or isopropanol, a ketone such as methyl isobutyl ketone or a benzene anologue such as benzene, toluene or xylene) containing water (10% or less), followed by addition of water to reprecipitate.

When the polyacrylate derivative of the invention is used as an agent for preventing the accumulation or attachment of periphyton, it is conventionally formulated in the form of a paint. The paint is usually composed of an organic solvent (as mentioned above) and a solution of a conventional resin for painting such as acrylic resins. The concentration of the polyacrylate derivative in the paint is usually about 2-30% by weight. Such paint can be applied to the subject by dip coating or direct coating.

To further illustrate the invention, and not by way of limitation, the following examples are given.

EXAMPLE 1

In a 1-liter three-neck flask was placed 500 ml of water and then 18.8 g (0.2 mol) of sodium polyacrylate having a degree of polymerization of 300. Dissolution was effected by heating (at 40° C.) and stirring. An equivalent of each of the quaternary ammonium compounds shown in Table 1 was dissolved in 370 ml of water. The resulting aqueous solution was slowly added with stirring to the aqueous solution of sodium polyacrylate. Stirring was continued for 30 minutes. The resulting precipitate was filtered off and fully washed with water, followed by vacuum drying at normal temperature. Thus there were obtained two kinds of quaternary ammonium salts of polyacrylic acid. Their solubility in solvents and compatibility with resins are shown in Tables 1 and 2 below, respectively.

TABLE 1

| Quaternary ammonium compound used | Solvent | Solubility |
|---|---|---|
| Tetradecyldimethylbenzyl-ammoniumchloride | Water | Insoluble |
|  | Methanol | Soluble |
|  | Isopropanol (IPA) | Insoluble |
|  | Water/IPA (5/95) | Soluble |
|  | Methyl isobutyl ketone (MIBK) | Insoluble |
|  | Water/MIBK (5/95) | Soluble |
|  | Xylene | Insoluble |
|  | Xylene/IPA/water (45/45/10) | Soluble |
| Benzethonium chloride | Water | Insoluble |
|  | Methanol | Insoluble |
|  | IPA | Insoluble |
|  | Water/IPA (5/95) | Soluble |
|  | MIBK | Insoluble |
|  | Water/MIBK (5/95) | Insoluble |
|  | Xylene | Insoluble |
|  | Xylene/IPA (50/50) | Soluble |

TABLE 2

| Quaternary ammonium compound used | Trade name of resin | Film appearance |
|---|---|---|
| tetradecyldimethylbenzyl-ammoniumchloride | LR-117 | Clear film with slight tackiness |
| | A-800 | Clear film |
| | EVAC-1000 | Clear film |
| Benzethonium chloride | LA-117 | Clear film with slight tackiness |
| | A-800 | Clear film |
| | EVAC-1000 | Clear film |

Remarks:
Film appearance was evaluated by using a film prepared from a solution in which the quaternary ammonium salt of polyacrylic acid and resin are dissolved in the ratio of 35/65 in a suitable solvent.

| Trade Name | Resin Name | Manufacturer |
|---|---|---|
| LR-117 | Acrylic polymer (N.V. 40%) | Mitsubishi Rayon Co., Ltd., Japan |
| A-800 | Polyvinyl acetate (N.V. 50%) | Daicel Chemical Industries, Ltd., Japan |
| EVAC-1000 | Ethylene-vinyl acetate copolymer (N.V. 50%) | Kuraray Co., Ltd., Japan |

Figure 2:
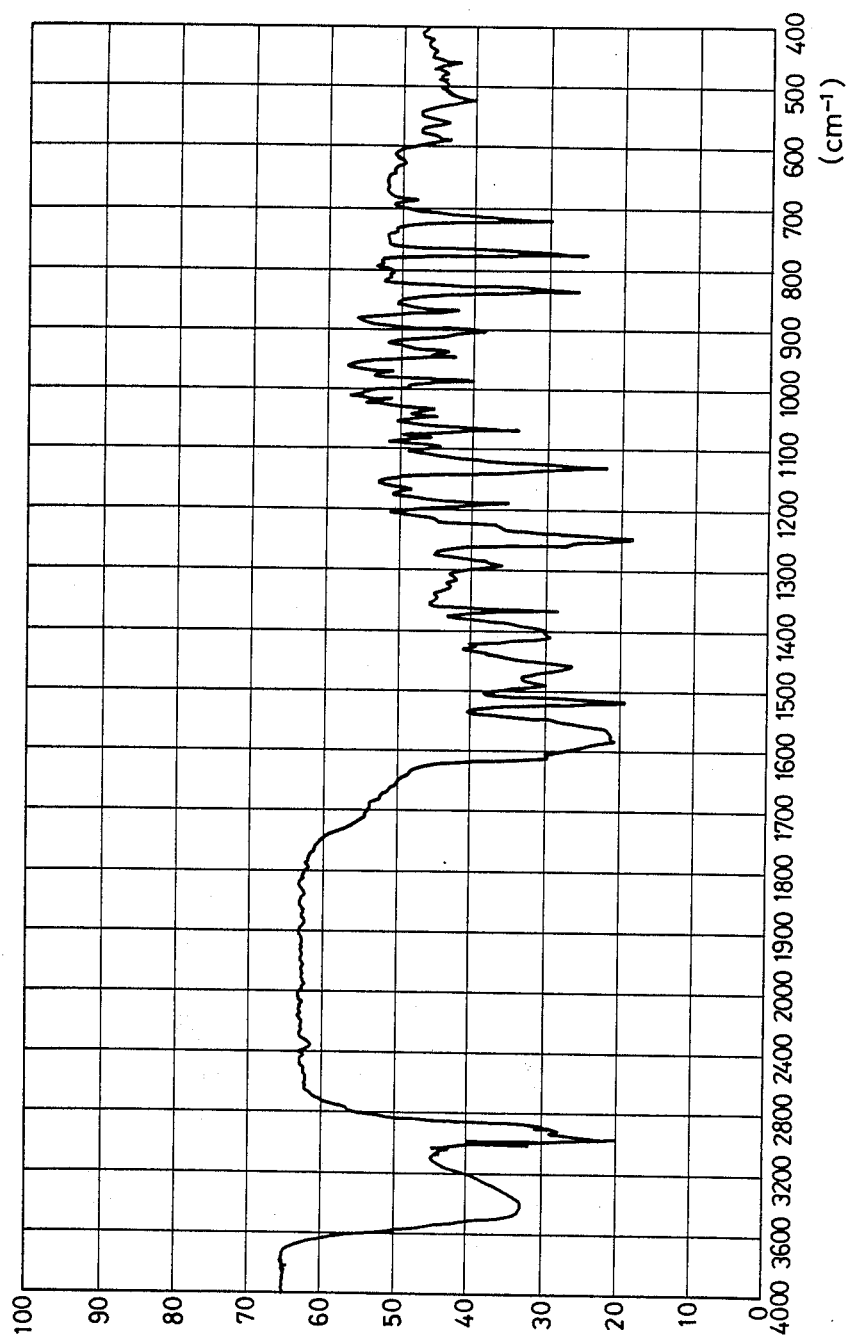
Figure 3:
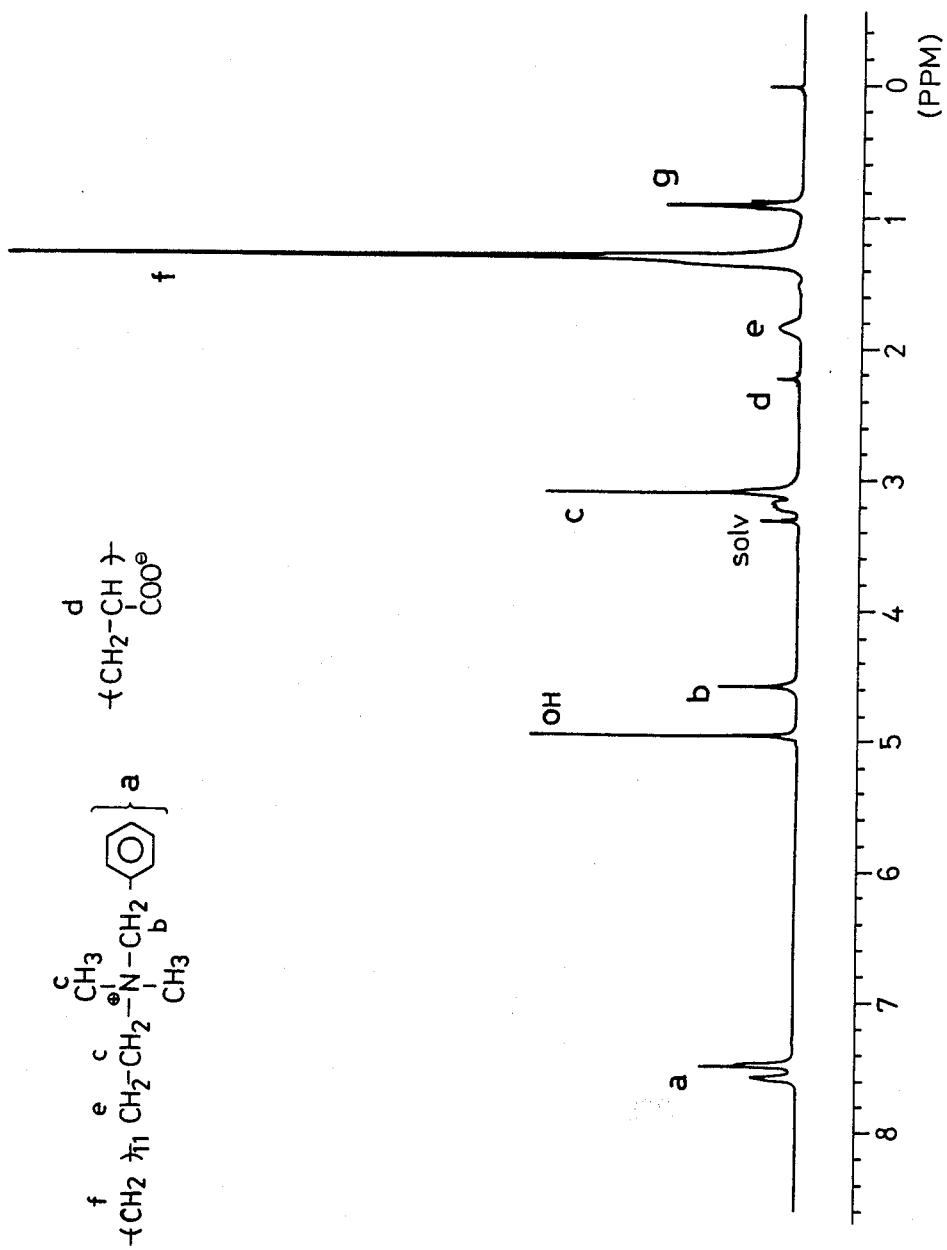
FIG. 3 and FIG. 4 are $^1$H-NMR spectra of tetradecyldimethylbenzylammonium salt of polyacrylic acid and benzethonium salt of polyacrylic acid, respectively.
Figure 4:
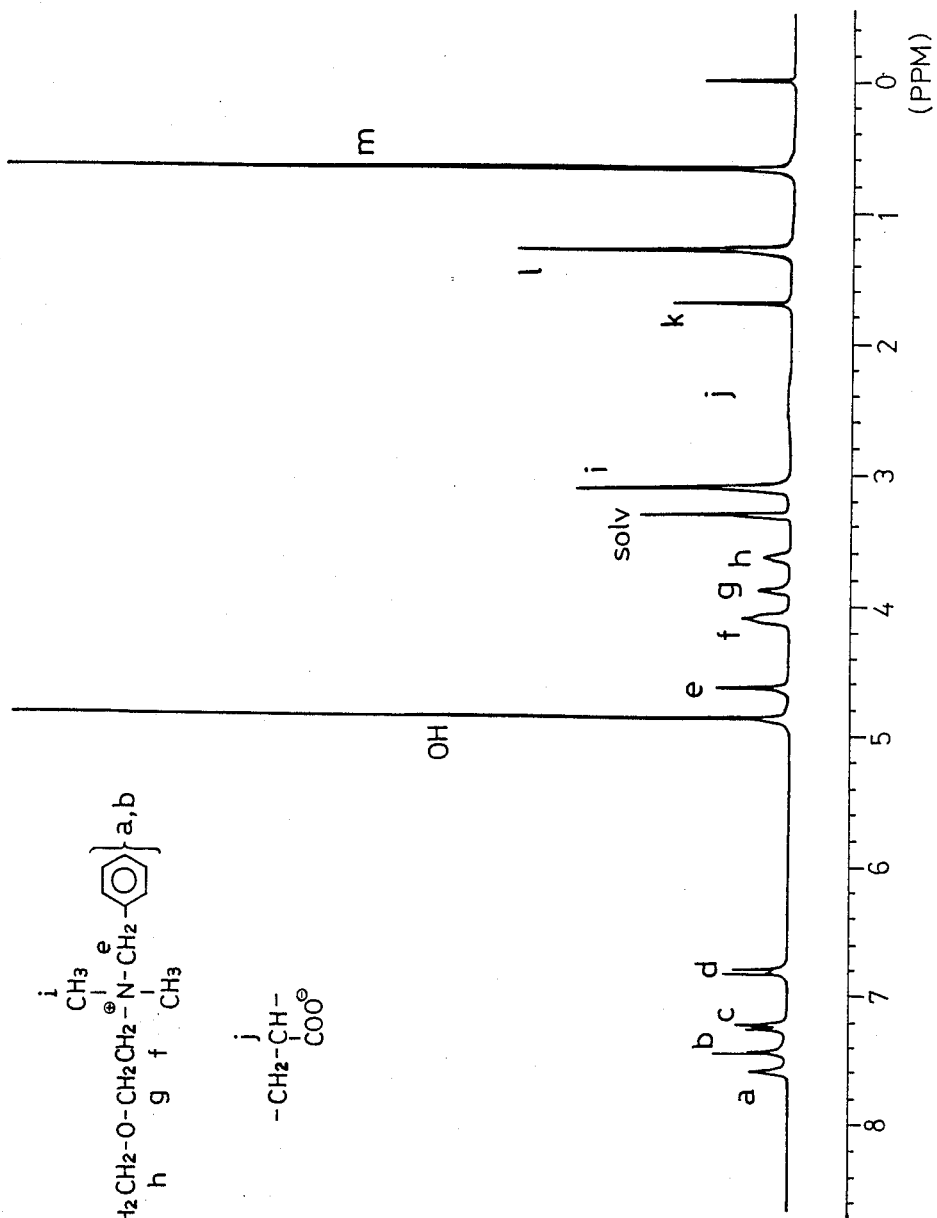

The thus obtained tetradecyldimethylbenzylammonium salt of polyacrylic acid and benzethonium polyacrylic acid were examined by elemental analysis, infrared absorption spectrometry, and $^1$H-NMR spectrometry. The results are shown below. (Refer to FIGS. 1 to 4).

(1) Tetradecyldimethylbenzylammonium salt of polyacrylic acid
Results of Elemental Analysis

| Element | Calculated value | Corrected value for 7% water content | Found value |
|---|---|---|---|
| C | 77.4% | 72.0% | 72.0% |
| H | 11.2% | 11.2% | 11.2% |
| N | 3.5% | 3.3% | 3.2% |

IR (KBr): 3400, 2860~2930, 1570, 1450, 1400, 730, and 707 cm$^{-1}$
$^1$H-NMR (ppm): 0.9 (g), 1.3 (f), 1.85 (e), 2.2~2.7 (d), 3.1~3.35 (c), 4.6 (b), 4.95 (H$_2$O), and 7.5~7.6 (a).

(2) Benzethonium salt of polyacrylic acid
Results of Elemental Analysis

| Element | Calculated value | Corrected value for 4.4% water content | Found value |
|---|---|---|---|
| C | 74.5% | 71.2% | 71.2% |
| H | 9.3% | 9.4% | 9.6% |
| N | 2.9% | 2.8% | 2.8% |

IR (KBr): 3400, 2860~3010, 1570~1585, 1418, 1415~1460, 1395~1410, 1365, 1245, 1190, 1128, 985, 902, 832, 770, and 720 cm$^{-1}$
$^1$H-NMR (ppm): 0.68 (m), 1.3 (l), 1.7 (k), 2.5 (j), 3.1 (i), 3.3 solv. (methanol/H$_2$O), 3.65 (h), 3.9 (g), 4.1 (f), 4.65 (e), 4.9 (H$_2$O), and 6.8 (d).

Test Example 1

An antifouling paint was prepared from 30 g of tetradecyldimethylbenzylammonium salt of polyacrylic acid obtained in Example 1, 175 g of acrylate paint (containing 70 g of acrylic resin LR-117 made by Mitsubishi Rayon Co., Ltd.), and 560 g of isobutanol. The paint was applied to a polyethylene fishing net by dipping. After drying for two days at normal temperature, the fishing net was immersed in seawater for two months. The accumulation or attachment of marine organisms on the fishing net was examined. The results are shown in Table 3.

TABLE 3

| | Weight increase of fishing net after application (%) | Accumulation or attachment of shellfishes | Accumulation or attachment of seaweeds |
|---|---|---|---|
| The control fishing net | None | Great many | Great many |
| The fishing net applied the paint | 5.1 | Very few | Some green laver |

What is claimed is:

1. A polyacrylate derivative represented by the formula below:

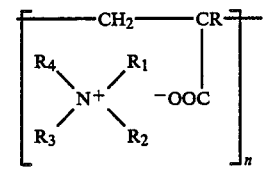

(where R is a hydrogen atom or methyl group; R$_1$ to R$_4$ are groups of which two are methyl groups, one is a benzyl group, and the remaining one is a tetradecyl group or p-1,1,3,3-tetramethylbutylphenoxyethoxyethyl group; and n is a numeral from 200 to 500.)

* * * * *

UNITED STATES PATENT AND TRADEMARK OFFICE
CERTIFICATE OF CORRECTION

PATENT NO. : 4,818,797  Page 1 of 2
DATED : April 4, 1989
INVENTOR(S) : KENZI TSUDA It is certified that error appears in the above-identified patent and that said Letters Patent is hereby corrected as shown below:

| Column | Line | |
|---|---|---|
| 1 | 11 | "salt" should read --salts-- |
| 1 | 16 | Delete "-" after dichlorobenzy |
| 1 | 17 | "106" should read --106-- |
| 1 | 19 | "37" should read --37-- |
| 3 | 1 | Insert -- Remarks: Solubility was examined by stirring 5g of the quaternary ammonium salt of polyacrylic acid in 100g of solvent.-- |

UNITED STATES PATENT AND TRADEMARK OFFICE
CERTIFICATE OF CORRECTION

PATENT NO. : 4,818,797

DATED : April 4, 1989

INVENTOR(S) : KENZI TSUDA

It is certified that error appears in the above-identified patent and that said Letters Patent is hereby corrected as shown below:

| Column | Line | |
|---|---|---|
| 3 | 4 | "tetradecyldimethylbenzyl" should read --Tetradecyldimethylbenzyl-- |

Signed and Sealed this

Twenty-ninth Day of May, 1990

Attest:

HARRY F. MANBECK, JR.

*Attesting Officer*  *Commissioner of Patents and Trademarks*